United States Patent
Zilberstein et al.

(10) Patent No.: US 11,977,479 B2
(45) Date of Patent: May 7, 2024

(54) LOG FILE SYSTEM (LFS) INVALIDATION COMMAND AND OPERATIONAL MODE

(71) Applicant: Western Digital Technologies, Inc., San Jose, CA (US)

(72) Inventors: Einav Zilberstein, Hod Hasharon (IL); Hadas Oshinsky, Hod Hasharon (IL); Yuliy Izrailov, Rishon LeZion (IL)

(73) Assignee: Western Digital Technologies, Inc., San Jose, CA (US)

( * ) Notice: Subject to any disclaimer, the term of this patent is extended or adjusted under 35 U.S.C. 154(b) by 62 days.

(21) Appl. No.: 17/573,169

(22) Filed: Jan. 11, 2022

(65) Prior Publication Data

US 2023/0222055 A1  Jul. 13, 2023

(51) Int. Cl.
*G06F 12/02* (2006.01)
(52) U.S. Cl.
CPC ................................ *G06F 12/0223* (2013.01)
(58) Field of Classification Search
None
See application file for complete search history.

(56) References Cited

U.S. PATENT DOCUMENTS

| | | | | |
|---|---|---|---|---|
| 9,696,935 | B2 * | 7/2017 | Hashimoto | G06F 3/0643 |
| 11,403,011 | B1 * | 8/2022 | Gunda | G06F 3/0679 |
| 2014/0281302 | A1 * | 9/2014 | Horn | G06F 3/0659 |
| | | | | 711/161 |
| 2017/0300246 | A1 * | 10/2017 | Michaeli | G06F 3/0688 |
| 2018/0307848 | A1 * | 10/2018 | Leiseboer | G06F 21/78 |
| 2019/0294350 | A1 * | 9/2019 | Hahn | G06F 3/0656 |
| 2022/0050620 | A1 * | 2/2022 | Jeon | G06F 3/061 |
| 2022/0171532 | A1 * | 6/2022 | Kang | G06F 3/064 |

FOREIGN PATENT DOCUMENTS

WO   WO-2011090500 A1 *  7/2011  ......... G06F 12/0246

* cited by examiner

*Primary Examiner* — Charles Rones
*Assistant Examiner* — Ryan Dare
(74) *Attorney, Agent, or Firm* — PATTERSON + SHERIDAN, LLP (57) ABSTRACT

A data storage device includes a memory device and a controller coupled to the memory device. The controller is configured to add one or more entries to a log file system (LFS) invalidation table and scan the LFS invalidation table during a storage optimization operation. Each entry of the one or more entries maps a new valid logical block address (LBA) to an old invalidated LBA. The new valid LBA is updated version of the old invalidated LBA. The storage optimization operation includes moving data from a first location to a second location.

18 Claims, 6 Drawing Sheets

LOG FILE SYSTEM (LFS) INVALIDATION COMMAND AND OPERATIONAL MODE

BACKGROUND OF THE DISCLOSURE

Field of the Disclosure

Embodiments of the present disclosure generally relate to data storage devices, such as solid state drives (SSDs), and, more specifically, validation of logical block addresses.

Description of the Related Art

Log file system (LFS) is a well-known solution and concept widely adopted in different markets and ecosystems. Examples of LFS are log FS, LFS/BDS, and F2FS. LFS is a file system in which data and metadata are written sequentially to a circular buffer (i.e., log). Advantages of LFS include improved write throughput and simpler recovery from crashes. LFS, as a concept, does not overwrite existing data, but rather, programs segments to free locations. The structure of LFS structure may be naturally suited for flash storages, where blocks are sequentially written and cannot be updated in place (i.e., overwritten).

When LFS writes the latest version of a file to new locations on a memory device, older versions of the file may be scattered through the memory device, such as in other blocks or within the same block. From a host device point of view, the older versions of the file are already invalidated. However, the older versions are still stored in the memory device, which may cause the memory device to reach storage capacity prematurely due to the invalid data. The data storage device may execute garbage collection on the blocks to recover storage space by moving valid data and erasing invalid data. However, garbage collection may be time or resource intensive. In LFS, the data storage device may not be able to distinguish between writes done in order to write new file data or writes done to update previously written file data. Because files that are updated relatively frequently are scattered on different places on a memory device in LFS, there may be an increase in a write amplification factor (WAF) of the memory device which may cause a decrease in read performance.

Therefore, there is a need in the art for an improved LFS invalidation tracking and garbage collection operation.

SUMMARY OF THE DISCLOSURE

The present disclosure generally relates to data storage devices, such as solid state drives (SSDs), and, more specifically, validation of logical block addresses. A data storage device includes a memory device and a controller coupled to the memory device. The controller is configured to add one or more entries to a log file system (LFS) invalidation table and scan the LFS invalidation table during a storage optimization operation. Each entry of the one or more entries maps a new valid logical block address (LBA) to an old invalidated LBA. The new valid LBA is updated version of the old invalidated LBA. The storage optimization operation includes moving data from a first location to a second location.

In one embodiment, a data storage device includes a memory device and a controller coupled to the memory device. The controller is configured to add one or more entries to a log file system (LFS) invalidation table, where each entry of the one or more entries maps a new valid logical block address (LBA) to an old invalidated LBA, and where the new valid LBA is updated version of the old invalidated LBA, and scan the LFS invalidation table during a storage optimization operation, where the storage optimization operation comprises moving data from a first location to a second location.

In another embodiment, a data storage device includes a memory device and a controller coupled to the memory device. The controller is configured to receive updated data for data previously written to the memory device, program the updated data to the memory device, and add an entry to a log file system (LFS) invalidation table, where the entry maps a first logical block address (LBA) corresponding to the data previously written to a second LBA corresponding to the updated data.

In another embodiment, a data storage device includes a memory device and means to use invalidation information in a log file system (LFS) invalidation table for a storage optimization operation.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, validation of logical block addresses. A data storage device includes a memory device and a controller coupled to the memory device. The controller is configured to add one or more entries to a log file system (LFS) invalidation table and scan the LFS invalidation table during a storage optimization operation. Each entry of the one or more entries maps a new valid logical block address (LBA) to an old invalidated LBA. The new valid LBA is updated version of the old invalidated LBA. The storage optimization operation includes moving data from a first location to a second location.

Figure 1:
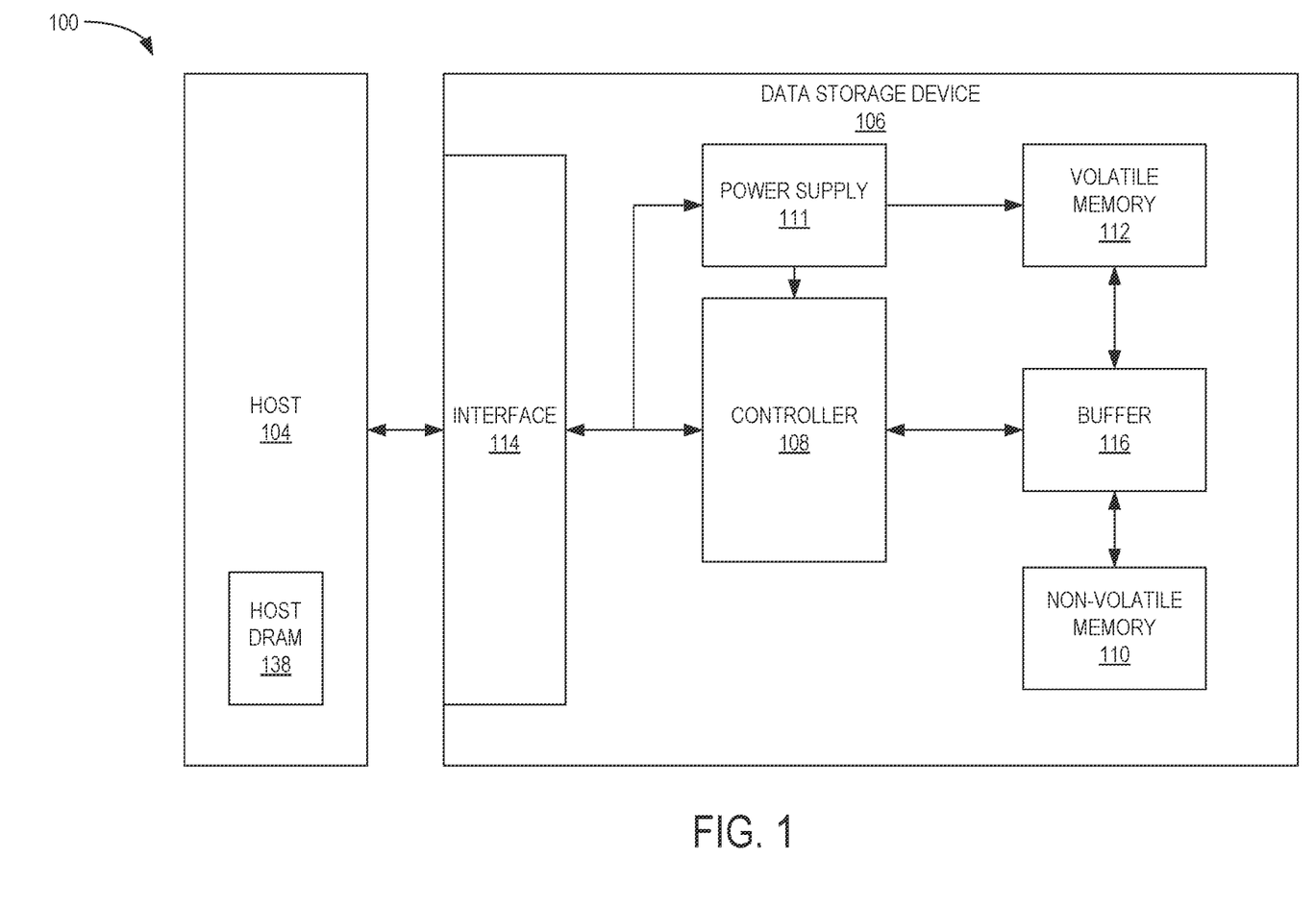
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2A:
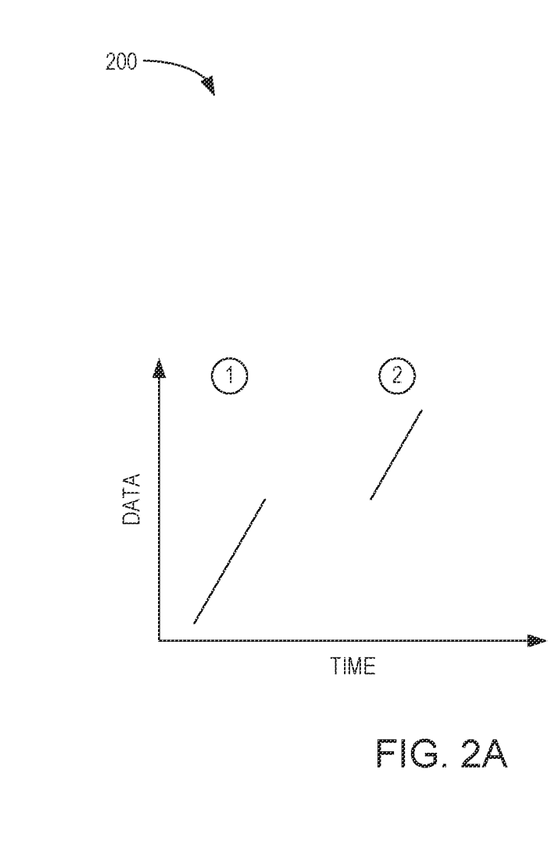
FIG. 2A is an illustration of a scenario where a host device writes a file to a memory device of a data storage device and updates the file in the memory device at a later time, according to certain embodiments.

FIG. 2A is an illustration of a scenario 200 where a host device, such as the host device 104 of FIG. 1, writes a file to a memory device of a data storage device, such as the NVM 110 of the data storage device 106 of FIG. 1, and updates the file in the memory device at a later time, according to certain embodiments. Aspects of the storage system 100 may be referenced herein for exemplary purposes. The initial writing of the file to the NVM 110 is indicated by "1". It is to be understood that the host device 104 may send a write command to the controller 108 to program the file to the NVM 110. For simplification purposes, the previously mentioned process may be referred to as the host device 104 writing the file to the NVM 110. The update to the file is indicated by "2".

At "1", the file is programmed to (logical block address) LBA 0. An LBA corresponds to the location of the data in the NVM 110 as seen by the host device 104. A physical block address (PBA) is the physical storage location of the data in the NVM 110 as seen by the data storage device 106. In order to associate LBAs to PBAs, a LBA to PBA (L2P) mapping may be used. Because the file may be greater than a LBA size, the file may be programmed to consecutive LBAs. For example, the file may have a size equal to about 32 LBAs. Therefore, the file may be programmed to LBA 0 to LBA 1. At "2", an update to the file is programmed to the NVM 110. Since the storage system 100 is operating in LFS mode, new data (e.g., the update to the file) is programmed sequentially and continuously to previous writes to the NVM 110.

Figure 2B:
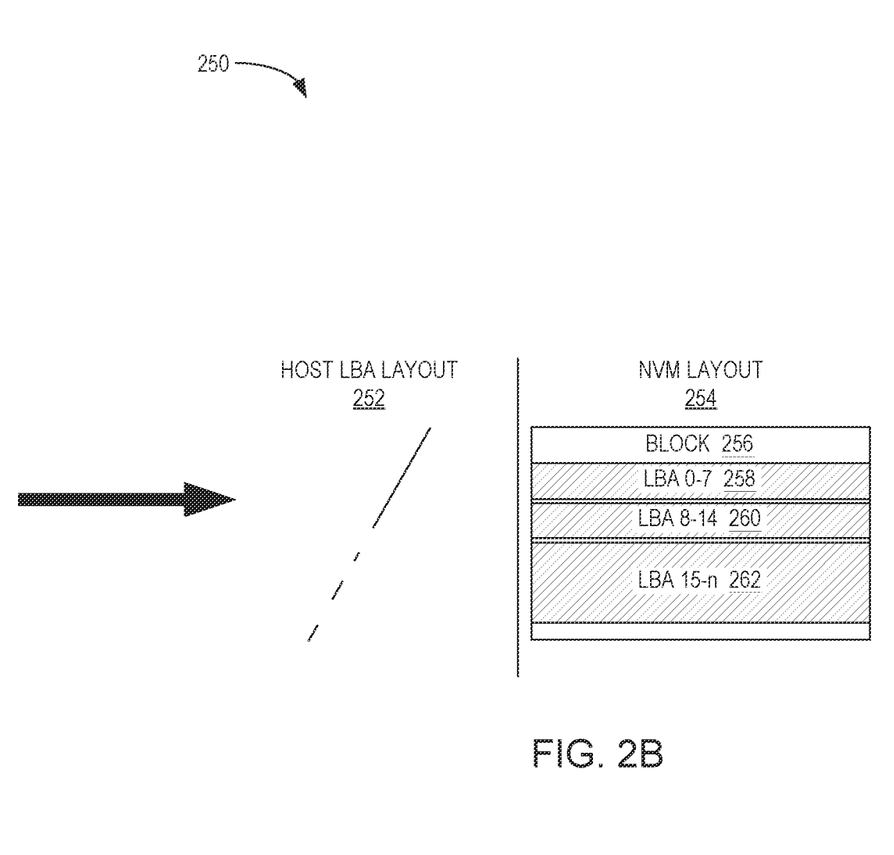
FIG. 2B is an illustration of a host LBA layout and an NVM layout of the scenario of FIG. 2A, according to certain embodiments.

FIG. 2B is an illustration of a host LBA layout 252 and an NVM layout 254 of the scenario 200 of FIG. 2A, according to certain embodiments. Aspects of the storage system 100 may be referenced herein for exemplary purposes. The host LBA layout 252 shows the initial file write at "1" and the update to the file at "2", where parts of the initial file write are obsolete or invalid due to the file update at "2". Thus, the LBAs of the file are non-contiguous in the host LBA layout 252. Because files are not updated in place, invalid or outdated parts of the file (or the entire file) may be located in the NVM 110. As shown in the NVM layout 254, the initial file write at "1" and the file update write at "2" is shown in block 256, where the file, including valid and invalid data, spans from LBA 0-7 258 to LBA 8-14 260 and from LBA 8-14 260 to LBA 15-n 262, where "n" is the last LBA associated with the file update at "2".

Because the file is fragmented (as shown in the host LBA layout 252), a read performance associated with a read from a first index of the file to a last index of the file may be negatively impacted. For example, non-sequential reads may have a higher latency than sequential reads due to having to determine which data is valid and which data is invalid. In order to improve performance, data management operations, which may be initiated by the host device 104, such as garbage collection, dedicated file defragmentation, or fstrim (i.e., a process in which the host device 104 scans the NVM 110 for invalid blocks), may be utilized to re-arrange the file LBAs and improve the read performance. In other words, the file is re-written by the host device 104.

Furthermore, the previously mentioned data management operations may be initiated by the host device 104 without any visibility to the internal storage conditions of the data storage device 106. In other words, even though the data storage device 106 may be reaching capacity or the data may be non-optimally stored, the host device 104 may not initiate the data management operations. The data storage device 106 may not have an ability to impact the process or optimize the process of data management operations in LFS. Thus, the write amplification factor (WAF) of the NVM 110 may be increased unnecessarily and the performance of the data storage device 106 may be decreased.

Figure 3:
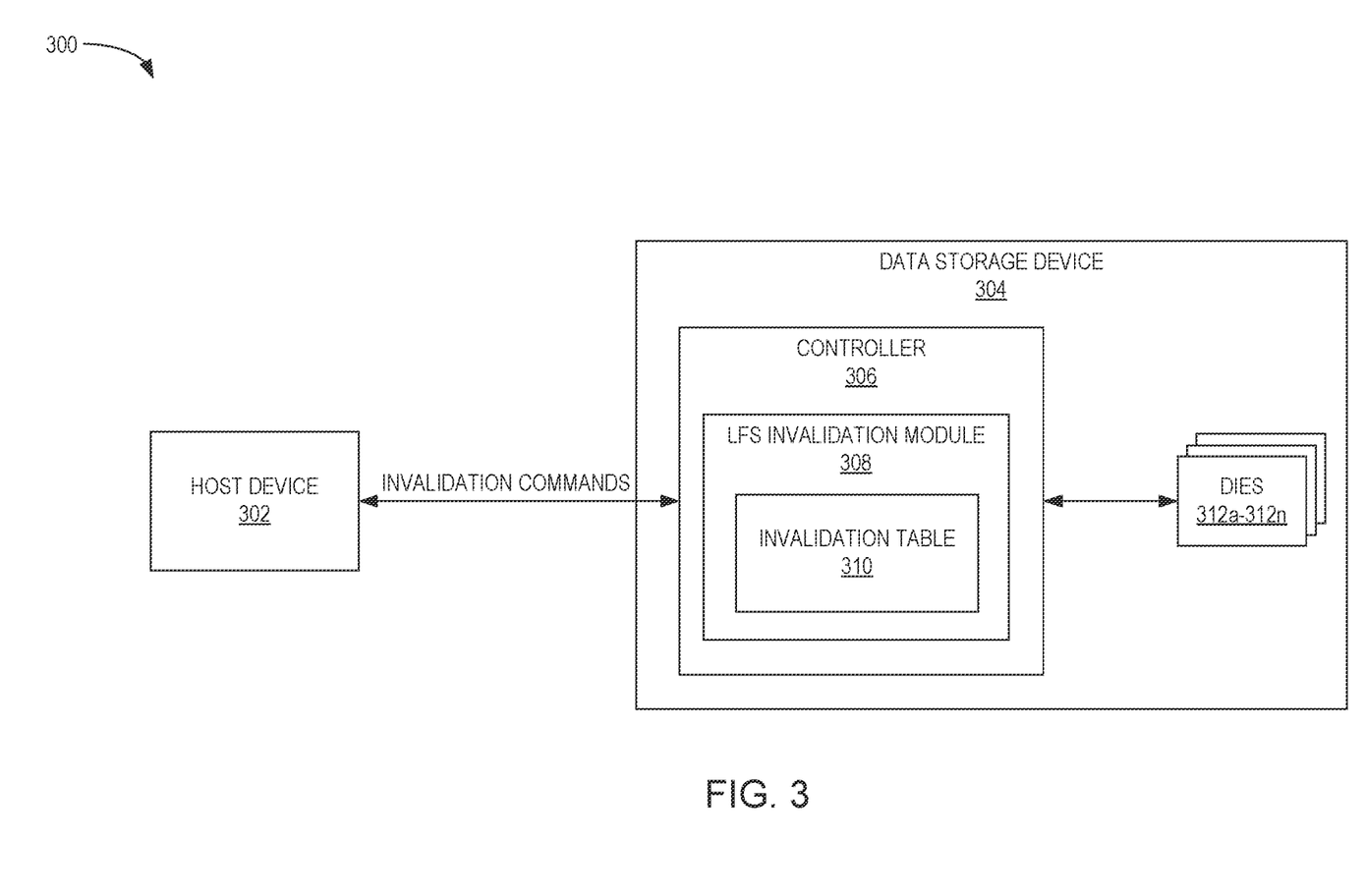
FIG. 3 is a schematic block diagram illustrating a storage system in which invalidation commands are passed between a host device and a data storage device, according to certain embodiments.

FIG. 3 is a schematic block diagram illustrating a storage system 300 in which invalidation commands are passed between a host device 302 and a data storage device 304, according to certain embodiments. Aspects of the storage system 300 may be similar to aspects of the storage system 100 of FIG. 1. For example, the host device 302 may be the host device 104, the data storage device 304 may be the data storage device 106, the controller 306 may be the controller 108, and a plurality of dies 312a-312n may be part of the NVM 110.

The data storage device 304 includes a controller 306 and the plurality of dies 312a-312n. The controller 306 includes an LFS invalidation module 308, where the LFS invalidation module 308 includes an invalidation table 310. It is to be understood that the LFS invalidation module 308 may include more than one invalidation table. The Invalidation table 310 may be stored in RAM of the controller 306, such as SRAM, or alternatively, DRAM. The invalidation table 310 may store a mapping, where the mapping associates an invalid LBA to an updated LBA. The updated LBA is an update of the invalid LBA. When invalidation commands are received by the controller 306 from the host device 302, the LFS invalidation module 308 generates an entry to add to the invalidation table 310. In some examples, the LFS invalidation module 308 may determine if there are previous entries corresponding to the received invalidation command. If there are previous entries corresponding to the received invalidation command, the LFS invalidation module may mark the previous entry as invalid.

Invalidation commands may have different formats. For example, an invalidation command may be "New LFS Invalidation=(Previous LBA X Invalidated, New Valid LBA Y)". Furthermore, the invalidation information may be sent to the controller 306 in a dedicated command or within new parameters/added headers of a regular write input/output (I/O) command. The host device 302 may send an indication to the controller 306 that a host garbage collection activity (e.g., garbage collection in the host device 302) is either taking place or has been completed. Thus, the indication may provide the LFS invalidation module 308 with entries for the invalidation table 310 or prepare the LFS invalidation module 308 to receive the invalidation information.

In some examples, the controller 306 may backup the invalidation table 310 in the NVM 110 so that the information of the invalidation table 310 is power fail safe. The controller 306 may back up the invalidation table 310 based on a threshold time since last backing up the invalidation table 310 elapsing or a threshold number of entries being stored in the invalidation table 310 since last backing up the invalidation table 310. Furthermore, the invalidation table 310 may be alternatively stored in a host memory buffer (HMB) of a host DRAM, such as the host DRAM 138 of FIG. 1, of the host device 302. In some examples, the controller 306 may back up the invalidation table 310 in the HMB.

TABLE 1

| Old Invalidated LBA X | New Valid LBA Y |
|---|---|
| LBA 2 | LBA 10 |
| LBA 3 | LBA 15 |
| LBAs 4-7 | LBAs 20-23 |

Entries of the invalidation table 310 may have a format of [Old Invalidated LBA X, New Valid LBA Y]. An example of the invalidation table 310 is shown in Table 1 above. In some examples, each entry in the invalidation table 310 may additionally have an age corresponding to the age of the entry. Each age may be tracked with a timer. The invalidation table 310 may be reset or relevant entries of the invalidation table 310 may be removed after a data management operation or a data relocation operation occurs to one or more dies (or blocks) of the plurality of dies 312a-312n.

A size of the invalidation table 310 may be optimized and variable depending on an estimated maximum number of entries to be stored to the invalidation table 310. For example, if the invalidation table 310 is reset (e.g., erased) upon host garbage collection activity indication, the invalidation table 310 may be sized as an aggregated "delta list" between consecutive host garbage collection activities. In another example, when an LBA is discarded or unmapped by the host device 302 (e.g., during a host garbage collection operation), the corresponding entry is removed from the invalidation table 310 using a discard command, which may reduce the need for a specific garbage collection activity indication from the host device 302. In yet another example, the size of the invalidation table 310 may be adjusted due to use of run length compression for consecutive LBA chunks being invalidated. For example, if LBA 0-10 and LBA 11-20 are invalidated, then the invalidation table 310 may include two entries, where a first entry is for LBA 0-9 and a second entry is for LBA 10-19. However, if the run length compression is utilized, then one entry may be used, where the one entry includes a start LBA (e.g., LBA 0) and a run length (e.g., 20) which indicates how many consecutive LBAs are invalidated.

Figure 4:
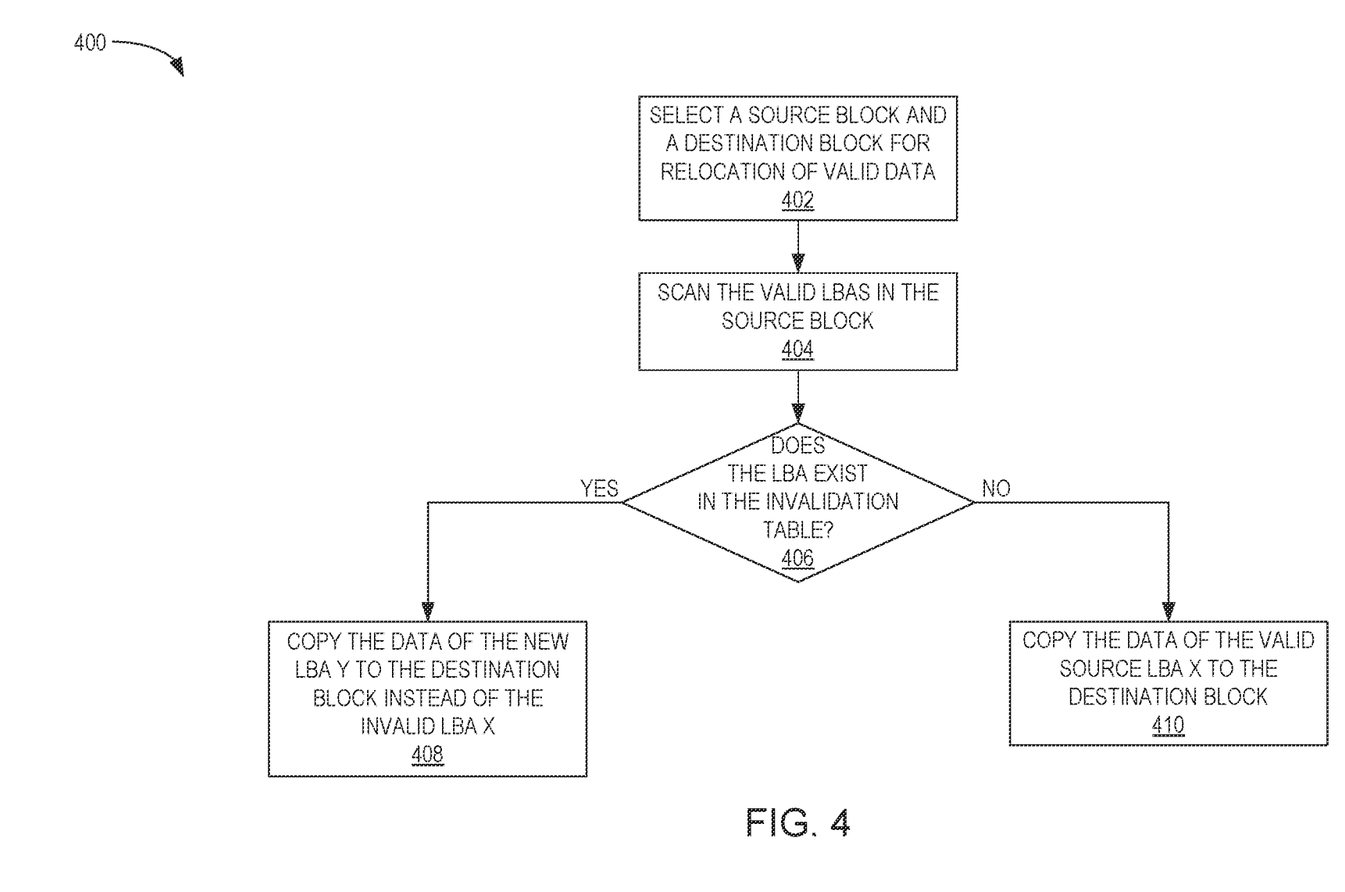
FIG. 4 is a flow diagram illustrating a method of relocating data, according to certain embodiments.

FIG. 4 is a flow diagram illustrating a method 400 of relocating data, according to certain embodiments. Aspects of the storage system 100 of FIG. 1 and the storage system 300 of FIG. 3 may be referenced herein for exemplary purposes. Method 400 may be executed by the controller 108 or the controller 306. Furthermore, method 400 may be implemented as part of a data management operation or data relocation operation, such garbage collection, SLC to TLC flush operations, or any other data relocation operation, where data is moved from a source block of the NVM 110 to a destination block of the NVM 110. In some examples, the data management operation may be initiated by the controller 306 due to an age of an entry exceeding a threshold age, a threshold number of indications corresponding to a number of entries having an age exceeding a threshold age, or a minimum number of free blocks being exceeded (i.e., the NVM 110 or memory device has less than a minimum number of free blocks available).

At block 402, the controller 306 selects a source block in the NVM 110 and a destination block in the NVM 110 for relocation of valid data. The relocation operation may be part of a data management operation, such as garbage collection. At block 404, the LFS invalidation module 308 scans the invalidation table 310 for the valid LBAs in the source block. For each LBA scanned, the controller 306 determines if the LBA exists in the invalidation table 310 at block 406. If the LBA does exist in the invalidation table 310 at block 406, then the controller 306 copies the data of the new LBA Y to the destination block instead of the invalid LBA X at block 408. However, if the LBA does not exist in the invalidation table 310 at block 406, then the data of the valid source LBA X is copied to the destination block at block 410.

Thus, the data in the destination block may be read sequentially and reside locally on the physical block, which may result in improved read performance. The sequential read may occur even if the host device 302 sends read requests for the data of the file in a random order based on the LBAs. For example, according to Table 1 above, LBA 2 is invalid and LBA 10 is the new valid LBA corresponding to the updated data of LBA 2, LBA 3 is invalid and LBA 15 is the new valid LBA corresponding to the updated data of LBA 3, and LBA 4 is invalid and LBA 20 is the new valid LBA corresponding to the updated data of LBA 4. Therefore, when the host device 302 sends a read request for LBA 0-4, the host device 302 may send the following read requests: LBA 0, LBA 1, LBA 10, LBA 15, and LBA 20.

In some examples, if the LBA does exist in the invalidation table 310 at block 406, then the controller 306 avoids copying the invalidated LBAs to the destination block. Thus, the controller 306 does not waste program/erase cycles on writing invalidated LBAs. Only LBAs that are valid are be copied, which may reduce WAF. The source block, including both valid and invalidated LBAs, are not erased until a data management operation, such as garbage collection, occurs. When the data management operation occurs, the source block is erased and added to a free block list. Prior to erasing the source block, the valid LBAs are copied to a destination block. In order to reduce ensure that blocks including valid LBAs and invalidated LBAs are not kept for an extended period of time (which may reduce the overall available space for data to be programmed to), an aging mechanism may be used. The aging mechanism may verify that the source block is not kept in a stage where the source block has already been validated, but not erased, for too long. For example, the aging mechanism may include a threshold time or exceeded or a minimum number of free blocks left threshold. When the source block reaches or exceeds the threshold time or the minimum number of free blocks left is reached or exceeded, a data management operation, such as garbage collection, may be executed on the source block.

Figure 5:
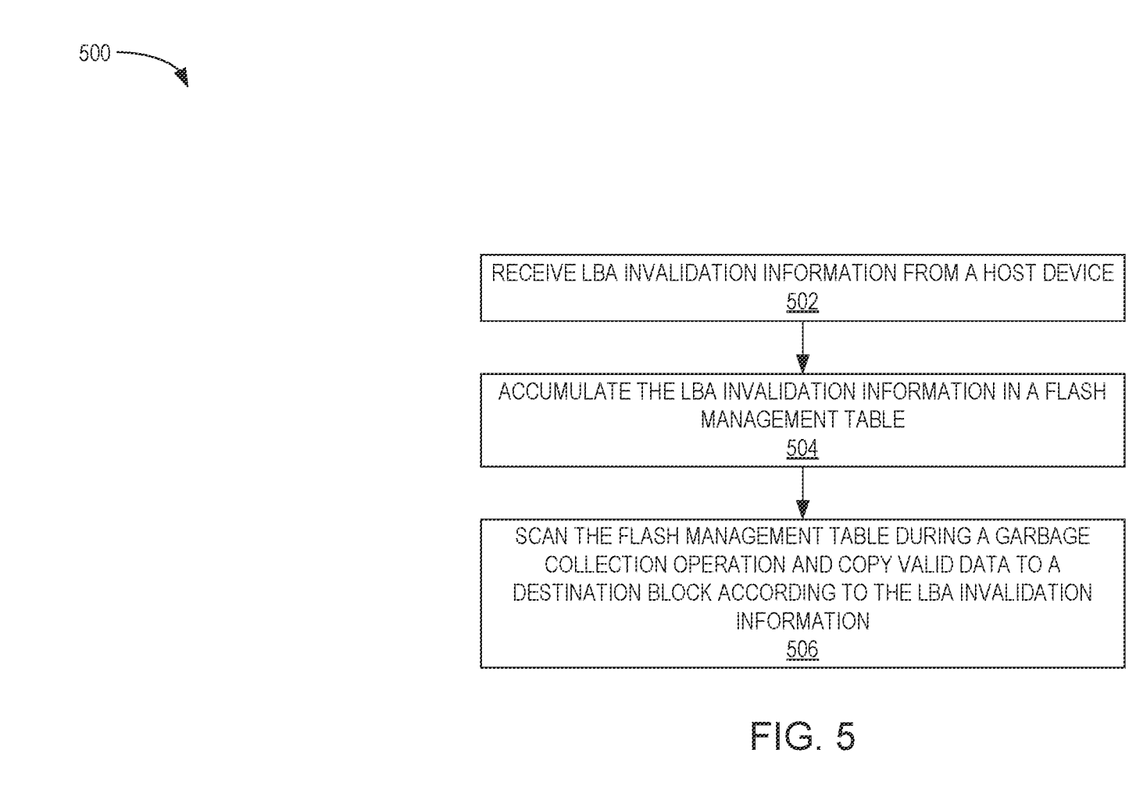
FIG. 5 is a flow diagram illustrating a method of storing invalidation information in a flash management table, according to certain embodiments.

FIG. 5 is a flow diagram illustrating a method 500 of storing invalidation information in a flash management table, according to certain embodiments. Aspects of the storage system 100 of FIG. 1 and the storage system 300 of FIG. 3 may be referenced herein for exemplary purposes. Method 500 may be executed by the controller 108 or the controller 306.

At block 502, the controller 306 receives LBA invalidation information from the host device 302. The invalidation information may be received in a dedicated command or within new parameters/added headers of a regular write I/O command or as part of a host garbage collection activity that is taking place or has been completed. It is to be understood that the previously listed indications is not intended to be limiting, but to provide an example of a possible embodiment. At block 504, the LFS invalidation module 308 accumulates the LBA invalidation information in a flash management table (e.g., the invalidation table 310). At block 506, the LFS invalidation module 308 scans the flash management table during a garbage collection operation (or any other relevant data relocation or data management operation) and the controller 306 copies the valid data to a destination block according to the LBA invalidation information.

Figure 6A:
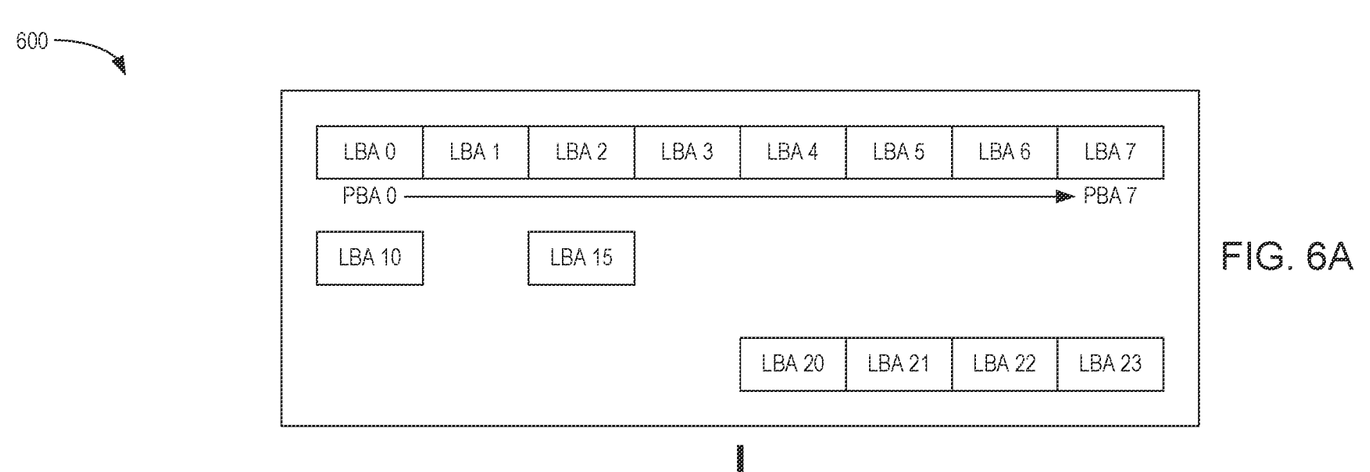
FIG. 6A is an illustration of a memory array layout before relocating data as part of a data management operation, according to certain embodiments.

FIG. 6A is an illustration of a memory array layout 600 before relocating data as part of a data management operation, according to certain embodiments. Aspects of the storage system 300 may be referenced herein for exemplary purposes. The memory array layout 600 may be part of an NVM, such as the NVM 110 of FIG. 1. For example, the memory array layout 600 may be a block of the NVM 110. For exemplary purposes, references to Table 1 may be utilized. The controller 306 programs LBA 0-LBA 7 to PBA 0-PBA7 of the memory array layout 600. LBA 10 is programmed to the memory array layout 600, where LBA 10 is updated data of LBA 2. Thus, LBA 2 is invalidated or outdated. The host device 302 may send invalidation information indicating that LBA 2 is invalid and LBA 10 is valid.

When the invalidation information is received, the LFS invalidation module 308 generates an entry indicating [LBA 2, LBA 10], which may be shown in row 2 of Table 1. Likewise, when LBA 15 is programmed to the NVM 110, the host device 302 may send invalidation information for LBA 3, where LBA 15 is the updated data of LBA 3. When the invalidation information is received, the LFS invalidation module 308 generates an entry indicating [LBA 3, LBA 15], which may be shown in row 3 of Table 1. Likewise, when LBA 20-23 is programmed to the NVM 110, the host device 302 may send invalidation information for LBA 4-7, where LBA 20-23 is the updated data of LBA 4-7. When the invalidation information is received, the LFS invalidation module 308 generates an entry indicating [LBAs 4-7, LBAs 20-23], which may be shown in row 4 of Table 1. Row 4 may alternatively be exemplified as [LBA 4, LBA 20, 4], which may in the format of [Starting Old Invalidated LBA X, Starting New Valid LBA Y, Run Length]. The previously mentioned format may be valid for any consecutive LBA entry (which may be more than one entry) in the invalidation table 310.

Figure 6B:
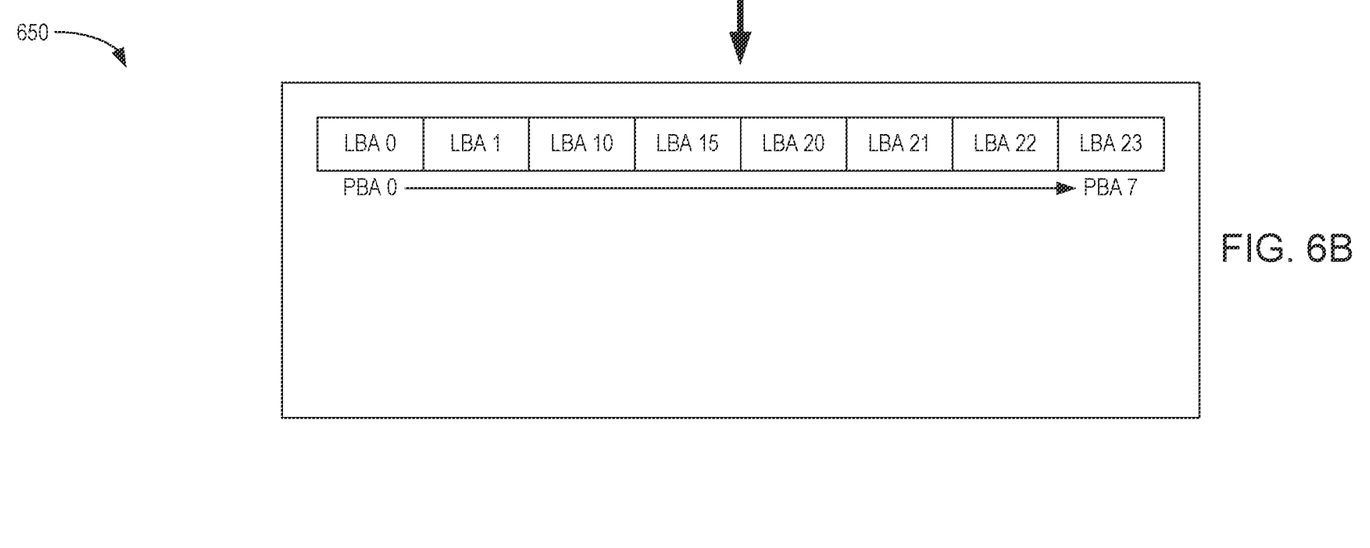
FIG. 6B is an illustration of a memory array layout after relocating data as part of a data management operation, according to certain embodiments.

FIG. 6B is an illustration of a memory array layout 650 after relocating data as part of a data management operation, according to certain embodiments. The memory array layout 650 may be after method 400 is executed on the memory array layout 600 of FIG. 6A. Aspects of the storage system 300 may be referenced herein for exemplary purposes. The memory array layout 650 may be part of an NVM, such as the NVM 110 of FIG. 1. For example, the memory array layout 650 may be a block of the NVM 110. For exemplary purposes, references to Table 1 may be utilized. The invalidated or outdated LBAs are no longer present (e.g., not copied) in the memory array layout 650. Even though the LBAs of the memory array layout 650 are not sequential, the data file is sequentially written to the memory array layout 650. Thus, read performance may be improved due to the sequentially written data being stored in the memory array layout 650.

By keeping track of invalidation information and leveraging data storage device awareness in LFS, the write amplification factor may be optimized and the file read performance may be improved. Thus, the overall performance of the data storage device may be improved.

In one embodiment, a data storage device includes a memory device and a controller coupled to the memory device. The controller is configured to add one or more entries to a log file system (LFS) invalidation table, where each entry of the one or more entries maps a new valid logical block address (LBA) to an old invalidated LBA, and where the new valid LBA is updated version of the old invalidated LBA, and scan the LFS invalidation table during a storage optimization operation, where the storage optimization operation comprises moving data from a first location to a second location.

The controller is configured to maintain the LFS invalidation table in a host memory buffer (HMB) of a host device. The controller is configured to reset LFS invalidation table after the storage optimization operation. The controller is configured to remove an entry of the one more entries after moving the data from the first location to the second location. During the storage optimization operation, the controller is configured to update the LFS invalidation table using a invalidation command. The invalidation command has a format including: New LFS invalidation=(the old invalidated LBA, the new LBA). The controller is configured to receive invalidation information in a dedicated command from a host device. The controller is configured to receive invalidation information in a header of a write command from a host device. Consecutive LBAs of the one or more entries are stored as a single entry using a run length. The controller is configured to maintain a timer for each of the one or more entries. The controller is configured to send an indication to a host device for the storage optimization operation when a threshold time for an entry of the one or more entries is exceeded. During the storage optimization operation, the controller is configured to scan the LFS invalidation table for each LBA of a selected block. The storage optimization operation occurs on the selected block.

In another embodiment, a data storage device includes a memory device and a controller coupled to the memory device. The controller is configured to receive updated data for data previously written to the memory device, program the updated data to the memory device, and add an entry to a log file system (LFS) invalidation table, where the entry maps a first logical block address (LBA) corresponding to the data previously written to a second LBA corresponding to the updated data.

The controller is further configured to receive invalidation information. The invalidation information maps the second LBA to the first LBA. The controller is further configured to select a source block and a destination block for relocation of valid data, scan the LFS invalidation table for LBAs of the source block, and copy updated data from the source block to the destination block. The controller is further configured to copy non-updated data from the source block to the destination block.

In another embodiment, a data storage device includes a memory device and means to use invalidation information in a log file system (LFS) invalidation table for a storage optimization operation.

The LFS invalidation table includes one or more entries. An age is associated with each entry of the one or more entries. The means to use invalidation information is further configured to alert a host device for the storage optimization operation when the age of an entry of the one or more entries exceeds a threshold age or a minimum number of free blocks is exceeded. The data storage device receives the invalidation information either in a dedicated command or in a header of a write command. The means to use invalidation information is configured to scan valid logical block addresses (LBAs) of a source block and check the LFS invalidation table for each of the scanned LBAs. The means to use invalidation information is configured to copy updated data to a destination block, where an entry in the LFS invalidation table corresponds to the updated data, and copy non-updated data to the destination block, where the LFS invalidation table does not include an entry for the non-updated data.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, the controller configured to:
add one or more entries to a log file system (LFS) invalidation table, wherein each entry of the one or more entries maps a new valid logical block address (LBA) to an old invalidated LBA, wherein each entry of the one or more entries contains the old invalidated LBA and the new valid LBA, and wherein the new valid LBA is updated version of the old invalidated LBA;
maintain a timer for each of the one or more entries, wherein the timer starts when the one or more entries is added the LFS invalidation table;
send an indication to a host device when the timer for an entry of the one or more entries exceeds a threshold; and
scan the LFS invalidation table during a storage optimization operation, wherein the storage optimization operation comprises moving valid data from at least a first location and a second location of the memory device to a third location of the memory device, wherein the valid data in at least the first location and the second location are non-sequential, and wherein the valid data in the third location is sequential.

2. The data storage device of claim 1, wherein the controller is configured to maintain the LFS invalidation table in a host memory buffer (HMB) of a host device.

3. The data storage device of claim 1, wherein the controller is configured to reset LFS invalidation table after the storage optimization operation.

4. The data storage device of claim 1, wherein the controller is configured to remove an entry of the one more entries after moving the data from at least the first location and the second location to the third location.

5. The data storage device of claim 1, wherein, during the storage optimization operation, the controller is configured to update the LFS invalidation table using a invalidation command, and wherein the invalidation command has a format comprising: New LFS invalidation=(the old invalidated LBA, the new LBA).

6. The data storage device of claim 1, wherein the controller is configured to receive invalidation information in a dedicated command from a host device.

7. The data storage device of claim 1, wherein the controller is configured to receive invalidation information in a header of a write command from a host device.

8. The data storage device of claim 1, wherein consecutive LBAs of the one or more entries are stored as a single entry using a run length.

9. The data storage device of claim 1, wherein the controller is configured to send an indication to a host device for the storage optimization operation when a threshold time for an entry of the one or more entries is exceeded.

10. The data storage device of claim 1, wherein, during the storage optimization operation, the controller is configured to scan the LFS invalidation table for each LBA of a selected block, and wherein storage optimization operation occurs on the selected block.

11. A data storage device, comprising:
a memory device; and
a controller coupled to the memory device, the controller configured to:
receive updated data for data previously written to the memory device;
program the updated data to the memory device;
add an entry to a log file system (LFS) invalidation table, wherein the entry maps a first logical block address (LBA) corresponding to the data previously written to a second LBA corresponding to the updated data, wherein the entry contains the first LBA and the second LBA;

maintain a timer for the entry, wherein the timer starts when the entry is added the LFS invalidation table;
send an indication to a host device when the timer for the entry exceeds a threshold;
initiate a selection of a source block and a destination block for relocation of valid data;
select the source block and the destination block for relocation of valid data;
scan the LFS invalidation table for LBAs of the source block; and
copy the valid data to the destination block, wherein the valid data stored in the source block is non-sequential, and wherein the valid data stored in the destination block is sequential.

12. The data storage device of claim 11, wherein the controller is further configured to receive invalidation information, and wherein the invalidation information maps the second LBA to the first LBA.

13. The data storage device of claim 11, wherein the controller is further configured to copy non-updated data from the source block to the destination block.

14. A data storage device, comprising:
means for storing data; and
a controller coupled to the means for storing data, wherein the controller is configured to:
use invalidation information in a log file system (LFS) invalidation table for a storage optimization operation, wherein the LFS invalidation table comprises one or more entries, wherein an age is associated with each entry of the one or more entries, and wherein using the invalidation information further comprises alerting a host device for the storage optimization operations when the age of an entry of the one or more entries exceeds a threshold age, wherein each entry of the one or more entries contains an old invalidated logical block address (LBA) and a new valid LBA, wherein using the invalidation information in the LFS invalidation table comprises:
scanning the LFS invalidation table for LBAs of a source block; and
copying valid data from the source block to a destination block, wherein the valid data stored in the source block is non-sequential, and wherein the valid data stored in the destination block is sequential.

15. The data storage device of claim 14, wherein using the invalidation information further comprises alerting a host device for the storage optimization operation when a minimum number of free blocks is exceeded.

16. The data storage device of claim 14, wherein the data storage device receives the invalidation information either in a dedicated command or in a header of a write command.

17. The data storage device of claim 14, wherein using the invalidation information further comprises:
scanning for valid LBAs of the source block; and
checking the LFS invalidation table for each of the scanned LBAs.

18. The data storage device of claim 14, wherein using the invalidation information further comprises:
copying updated data to a destination block, wherein an entry in the LFS invalidation table corresponds to the updated data; and
copying non-updated data to the destination block, wherein the LFS invalidation table does not include an entry for the non-updated data.

* * * * *